United States Patent
Wohied et al.

(10) Patent No.: US 9,454,753 B2
(45) Date of Patent: Sep. 27, 2016

(54) FRIENDLY FUNDING SOURCE

(75) Inventors: Abdul Usman Wohied, Tamil Nadu (IN); Sabarirajan Jeeva, Tamil Nadu (IN)

(73) Assignee: PAYPAL, INC., San Jose, CA (US)

(*) Notice: Subject to any disclaimer, the term of this patent is extended or adjusted under 35 U.S.C. 154(b) by 597 days.

(21) Appl. No.: 13/073,722

(22) Filed: Mar. 28, 2011

(65) Prior Publication Data

US 2012/0254021 A1 Oct. 4, 2012

(51) Int. Cl.
*G06Q 40/00* (2012.01)
*G06Q 20/10* (2012.01)

(52) U.S. Cl.
CPC .................... *G06Q 20/10* (2013.01)

(58) Field of Classification Search
USPC ..................................................... 705/35–44
See application file for complete search history.

(56) References Cited

U.S. PATENT DOCUMENTS

| | | | |
|---|---|---|---|
| 2001/0047310 A1* | 11/2001 | Russell | G06Q 20/04 705/26.41 |
| 2008/0133407 A1* | 6/2008 | Guillory | G06Q 30/04 705/40 |
| 2008/0277465 A1* | 11/2008 | Pletz et al. | 235/379 |
| 2010/0114733 A1* | 5/2010 | Collas | G06Q 20/12 705/26.1 |
| 2012/0197754 A1* | 8/2012 | Kalin | G06Q 10/08 705/26.8 |
| 2012/0221420 A1* | 8/2012 | Ross | G06Q 40/00 705/16 |

* cited by examiner

*Primary Examiner* — Olabode Akintola
(74) *Attorney, Agent, or Firm* — Haynes and Boone LLP

(57) ABSTRACT

A user can select one or more friendly funding sources to make a payment. The friendly funding sources are pre-approved by a "friend" of the user and have restrictions for use. When the user desires to make a payment, the user sees one or more friendly funding sources and can choose any combination of friendly funding sources and conventional funding sources for making the payment.

21 Claims, 4 Drawing Sheets

FRIENDLY FUNDING SOURCE

BACKGROUND

1. Field of the Invention

The present invention generally relates to on-line payments, and in particular, to funding of on-line payments.

2. Related Art

More and more consumers are purchasing items and services over electronic networks, such as the Internet. Consumers routinely search for and purchase products and services from merchants and individuals alike. The transactions can take place directly between an on-line merchant or retailer and the consumer, where payment is typically made by entering credit card or other financial information. Transactions can also take place with the aid of an on-line payment provider, such as PayPal, Inc. of San Jose, Calif. Such payment providers can make transactions easier and safer for the parties. Payment providers enable payments to be made through many different convenient methods.

When making a payment, the payer, user of the services, or consumer typically specifies a funding source for the payment. Examples of funding sources can be an account with the payment provider, a credit card, a bank or checking account, or the like. When the user specifies a funding source, the payment provider may process the payment request to determine whether the user has sufficient funds or credit to make the payment. If so, the payment request is approved, and the purchase is completed. However, if there are insufficient funds or credit, the payment request may be denied, resulting a lost sale for the seller or payee and a lost purchase by the buyer or payer.

SUMMARY

In accordance with different embodiments, a user of a payment provider service, such as PayPal, Inc. of San Jose, Calif., is able to select one or more "friends," who also have accounts with the payment provider, as an alternate or additional funding source of a payment. Each "friend" or friendly funding source identifies one or more other users of the payment provider service as ones that can use the friend to fund a payment. The friendly funding source may also set limits on the funding for each user. For example, user A, identified by an email address, user name, phone number, or other unique identifier, may have a per transaction limit, a per day limit, a per week limit, a per month limit, and/or other type of limit. User B may have the same or different limits.

When a user is ready to make a purchase through the payment provider, the user may see one or more friends or friendly funding sources as funding options, along with any limits associated with each friendly funding source. The user can then select one or more of the friendly funding sources, either with or without another traditional funding source, such as the user's payment provider account or checking account.

The payment is processed using one or more friendly funding sources. Thus, the user is able to make a purchase in a situation where the user may not have been able to make the purchase using conventional means. The friendly funding source(s) may be notified by the payment provider when source is used, including the identity of the user and the amount used.

These and other features and advantages of the present invention will be more readily apparent from the detailed description of the embodiments set forth below taken in conjunction with the accompanying drawings.

Figure 1:
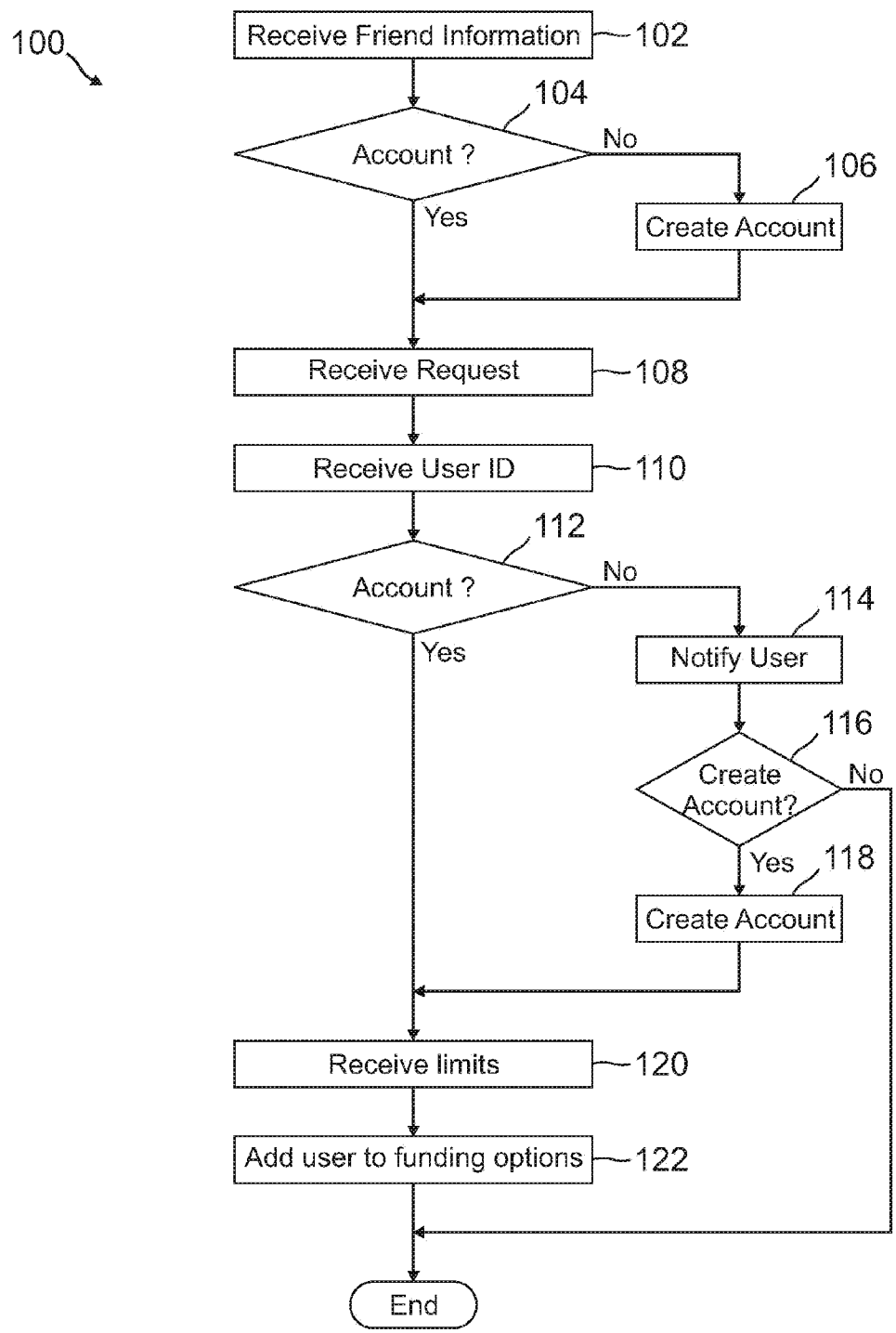
FIG. 1 is a flowchart showing a process for a payment provider in creating a friendly funding source according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

FIG. 1 is a flowchart 100 showing a process for a payment provider in creating a friendly funding source, according to one embodiment. At step 102, the payment provider, such as PayPal, Inc. of San Jose, Calif., receives information about the friend or friendly funding source. The friend is someone or something who will be giving pre-approval for another to use a certain amount of the friend's funds to fund a payment from another during a transaction, as will be described in more detail herein. The friend typically enters the payment provider site, such as through a PC, laptop, smart phone, or other computing device. Once on the payment provider site, the friend may enter user information, such as a user name, email, phone number, etc. that identifies the friend to the payment provider. This information is communicated to and received by the payment provider at step 102.

Using this information, the payment provider determines, at step 104, whether the friend has an account with the payment provider. This can be done by searching an account database of the payment provider with the friend information. If no account exists, the friend may be asked to enter information again, as the original information may have been entered incorrectly. If still no account is found, an account may be created at step 106. Account creation may include the payment provider requesting certain information from the friend, such as a username, email address, phone number, credit card information, bank information, PIN, password, and/or address. Using the requested information, the payment provider creates an account for the friend at step 106. Note that if an account was found, but not valid, such as expired funding source, expired account, etc., the payment provider may only need to request a limited amount of information to re-activate the account, such as an a valid funding source.

Once an account is created or if the friend has a valid account, the payment provider next receives a request, at step 108, from the friend to add the friend as a funding source for one or more other users. This may be received in any suitable manner. For example, the friend may see an option or notification or tab on the friend's home page, which the friend selects, to be added as a funding source.

The request may be sent in any suitable manner. For example, a user can ask for a certain amount of funds from the friend to be approved.

Upon receiving this request, the payment provider may ask the friend to provide an identifier of the user for which the friend will be a funding source for. In one embodiment, the identifier is an email address, although other identifiers may also be suitable, such as, but not limited to a username or a mobile phone number. The friend enters the requested information and communicates it to the payment provider, which the payment provider receives at step 110.

The payment provider then determines, at step 112, whether the user has an account with the payment provider, such as by searching based on the information received at step 110. If the user does not have an account or a valid account, the user is notified at step 114. Notification may be through any available contact information and means. For example, if the friend provided a user email address, the payment provider may send the user an email about opening or creating an account and that a friend has offered to be a funding source. If the friend provided a mobile phone number, the payment provider may send an SMS text message to the user. Other means may also be possible, such as a voice message or mailed letter.

Next, a determination is made, at step 116, whether the user wishes to open or create an account with the payment provider. The determination may be based on whether anything is received by the user, either electronically or by mail. Without a response or with an affirmative indication that the user does not want to open an account, the process ends, and the friend may be notified that the user does not have an account with the payment provider, so that the friend cannot be added as a friendly funding source for the user.

However, if the user does wish to create an account, an account is created at step 118. Account creation may include the payment provider requesting the user for specific information, such as name, username, password, PIN, mailing address, credit card or bank information, etc. With this information, the payment provider may create an account for the user at step 118.

Once a user account is created (step 118) or found (step 112), the payment provider receives limits for the funding at step 120. The friend enters limits for the user, which are transmitted to the payment provider. The friend may set specific limits or different limits may be provided by the payment provider for the friend to select. Examples of limits include: 1) a dollar amount to be funded per transaction, 2) a dollar amount to be funded per day, per week, per month, or other time period, 3) a total number of transactions per day, per week, per month, or other time period, 4) certain categories for funding or certain categories for not funding, 5) certain payees for funding or certain payees for not funding, 6) different funding limits for different categories of purchases, and/or 7) a time limit for when the funding will be available or will expire. Various combinations of the above or other limits can be set for the friend to control funding for the user.

For example, a parent may allow funding for a child, but only for school supplies, gas, and food. The parent may allow the child to use $100 per day for school supplies the week before and after a semester or quarter starts, but only $100 per week during the other times of the school year. The parent may also limit $50 per month for gas. Numerous other possibilities exist for the friend to control and limit funding for the user.

Upon receiving user limits, the payment provider associates the limits with the user's account and the friend's account. The friend's account is added, at step 122, as a funding option for the user when the user is making a payment through the payment provider. Thus, when the user is ready to make a payment, the user sees the friend's account as a possible funding source, which can be used partially or entirely to fund a payment or purchase.

Figure 2:
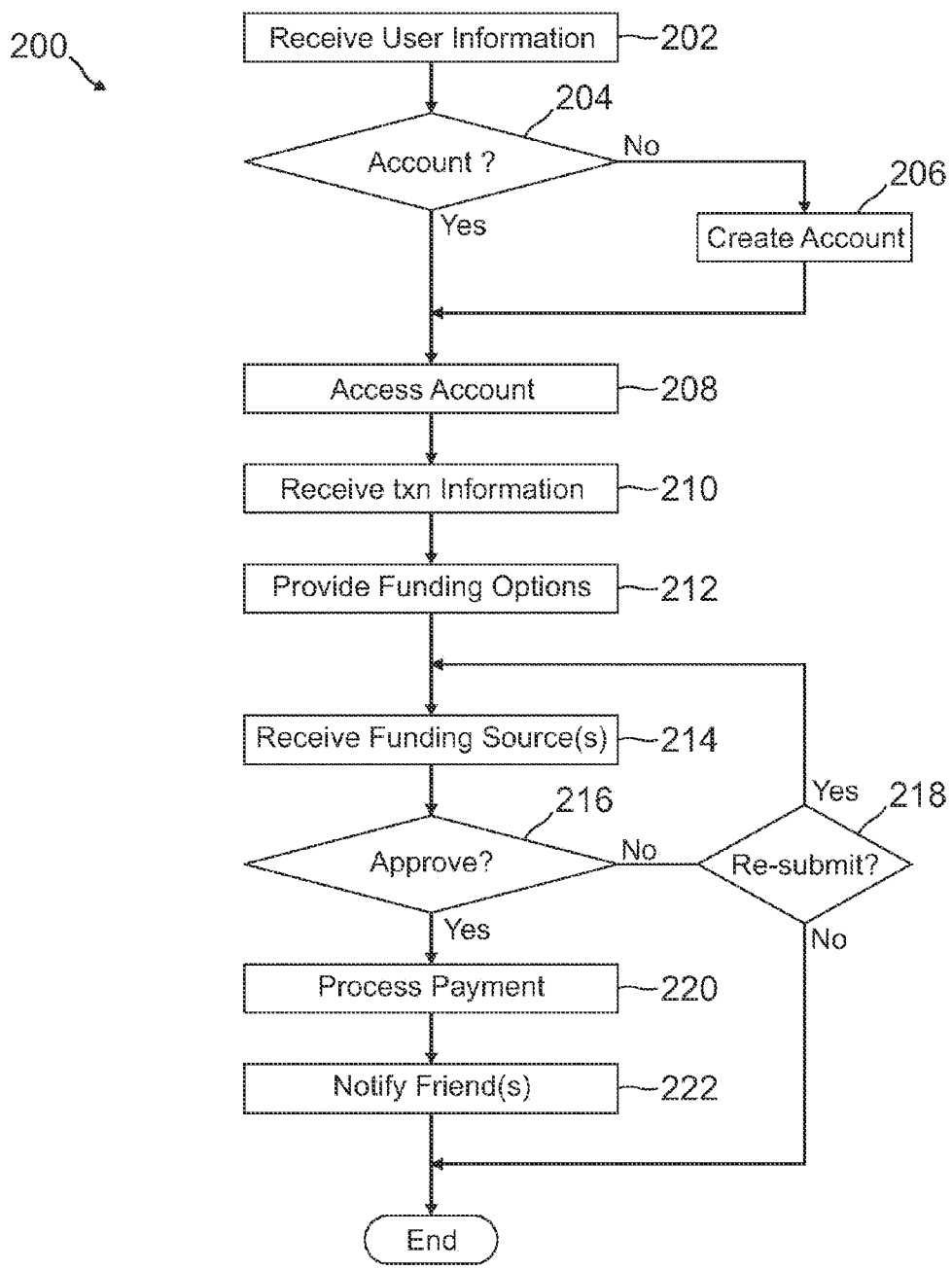
FIG. 2 is a flowchart showing a process for a payment provider in making a payment using a friendly funding source according to one embodiment.

FIG. 2 is a flowchart 200 showing a process for a payment provider in making a payment using a friendly funding source according to one embodiment. At step 202, the payment provider receives user information. The user is the customer, consumer, or the entity/person making a payment. User information may include the user's name, email address, phone number, username, password, PIN, and/or other identifier for the payment provider. The payment provider may receive the user information by accessing the payment provider web site, such as through a PC, smart phone, laptop, or other computing device. The user then enters information to access the user's account.

At step 204, the payment provider determines whether the user has an account with the payment provider, based on the information received at step 202. The payment provider may make the determination by searching an account database using the information provided. Results may include no account exists, an active account exists, or an inactive account exists. If the payment provider does not find a valid or active account, the payment provider may create an account for the user, at step 206, if desired by the user. This may include the user entering requested information, such as name, email address, phone number, mailing address, credit card or bank information, social security number, password, PIN, etc.

Once the user's account is created (step 206) or found (step 204), the payment provider accesses the account at step 208. Accessing the account allows the payment provider to determine certain information about the user and/or the account, such as account limits or restrictions, available funding sources, etc. It also enables the payment provider to make any determinations about the authenticity of the user.

After account access, the payment provider receives transaction information at step 210. The transaction information may be received by an indication that the user is ready for check-out or payment of selected items, services, donations, or digital goods. For example, the user may select the desired items by placing them in a cart on a merchant site and selecting a button or link, such as "Checkout," "Pay," "Continue," etc. This may transmit or lead to transmitting the transaction information to the payment provider. Transaction information may include merchant identification, including a merchant account identifier, and purchase information, including price, tax, shipping costs, and totals.

The payment provider determines funding options for the user and the transaction, such as based on the user information and/or the transaction information. For example, the user may have specific funding options associated with the account. Conventional funding options may include a user bank/checking account and one or more credit cards. The user may also have limits to these conventional funding options, such as limits imposed by the instrument or a user controlling the instrument like a parent.

The funding options may also include one or more funding sources from friends of the user (i.e., "friendly funding sources), as described above. Thus, any of the user's friends who had previously designated the user as one who could use their account for funding a payment would be included as a possible funding option for the current transaction.

The available funding sources are then provided to the user at step 212. The friendly funding sources may include an identification of the person, such as the friend's name or email address. Other information may include any restrictions for the friendly funding source, such as limits. In one embodiment, the payment provider only provides or shows friendly funding sources that can be used with the particular transaction. Thus, even though the user may be associated with several different friendly funding sources, the specifics of the transaction may exclude one or more of those sources. In other embodiments, all friendly funding sources are shown to the user, regardless of whether one or more may be unusable due to the details of the transaction.

Based on the funding sources provided by the payment provider, the user selects one or more funding sources as payment for the transaction. Selection may be by simply checking a box next to desired ones of the funding sources or other selection means, such as clicking on the desired funding source. The selected funding source(s) are then communicated to and received by the payment provider at step 214.

Next, the payment provider determines whether to approve the payment at step 216. The determination process may include checking on limits or restrictions associated with the user's account, the details of the transaction or purchase, and the availability of one or more selected funding sources. Any number of reasons may cause the transaction to be declined, such as any indication of a fraudulent transaction, the type of transaction, purchase, or merchant was specifically forbidden, spending limits have been reached or exceeded, and/or insufficient funds for the transaction amount. For example, the user may have selected one or more friendly funding sources that are not available for this transaction or user based on restrictions placed on the friendly funding sources and/or the funding sources selected are insufficient to fund the transaction amount.

If the requested payment is not approved, the user may have the option of re-submitting the request by changing one or more parameters, such as adding a funding source and/or changing a funding source. If the user wishes to re-submit the request, as determined at step 218, the user re-submits and the payment provider receives the new funding sources at step 214, where processing continues as before. If the user does not wish to re-submit the request or the user is not given the option of re-submitting (such as in the case where the reason for not approving the transaction was based on the actual type of transaction), then the transaction ends without a payment.

However, if the transaction request is approved, the payment provider processes the payment at step 220. The processing may include debiting the appropriate amount of funds from each of the specified funding sources and/or accounts, crediting the appropriate amount of funds to the payee or merchant, and notifying the payee or merchant that the payment request has been approved. Notification can be by any means, including email, text, through the merchant or seller site, etc. Once notified, the merchant can release, ship, or otherwise transfer the purchase to the user.

If the user is using one or more friendly funding sources, the "friends" may also be notified, at step 222, that the user has used their account to make a purchase. The notification may be through email, text, phone call, or notification on the friend's account page with the payment provider. The friend may be informed about various details of the transaction, including amount of funds used, total amount of the transaction, description of the purchase, the merchant or payee, and the date of the transaction.

Therefore, using embodiments of the present invention, a user may be able to make a purchase, where in the past, the user may not have been able to make the purchase. The reason is that one or more friends have allowed the user to use at least a portion of their account as a funding source for the purchase. This results in a sale that otherwise may not have happened. The friends can control the use of their funds at any time, which limits exposure or abuse of these additional funding sources. For example, a friend may see that the user is using the friendly funding source for non-essential items, resulting in the friend placing additional restrictions on the user or removing the source altogether. In another example, a parent may see that a child is using the funds for school supplies, but that the school supplies are costing more than anticipated. The parent may then raise limits on the friendly funding source for purchase of school supplies.

Figure 3:
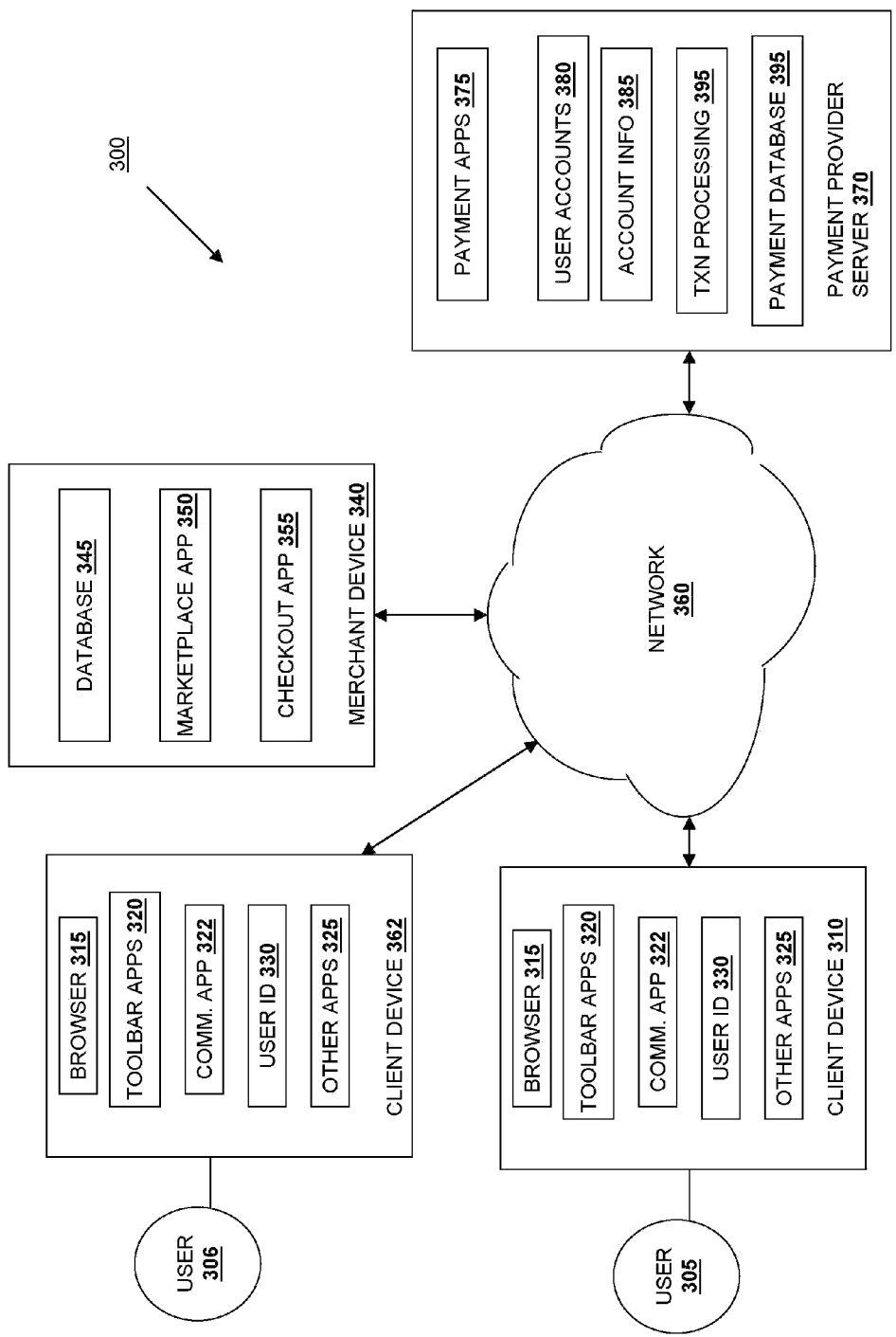
FIG. 3 is block diagram of a networked system suitable for implementing the process of FIGS. 1 and 2 according to an embodiment.

FIG. 3 is a block diagram of a networked system 300 configured to handle a financial transaction between a recipient (e.g., merchant) and a sender (or user), such as described above, in accordance with an embodiment of the invention. System 300 includes a first user device 310, a second user device 362, a merchant server 340, and a payment provider server 370 in communication over a network 360. Payment provider server 370 may be maintained by a payment provider, such as PayPal, Inc. of San Jose, Calif. A first user 305, such as the sender or purchaser, utilizes first user device 310, and a second user 306, such as a friend, utilizes second user device 362, where first user device 310 is used to perform a payment transaction with merchant server 340 using payment provider server 370.

First user device 310, second user device 362, merchant server 340, and payment provider server 370 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

Network 360 may be implemented as a single network or a combination of multiple networks. For example, in various embodiments, network 360 may include the Internet or one or more intranets, landline networks, wireless networks, and/or other appropriate types of networks.

First user device 310 and second user device 362 may be implemented using any appropriate hardware and software configured for wired and/or wireless communication over network 360. For example, in one embodiment, the two user devices may be implemented as a personal computer (PC), a smart phone, personal digital assistant (PDA), laptop computer, and/or other types of computing devices capable of transmitting and/or receiving data, such as an iPad™ from Apple™.

First user device 310 may include one or more browser applications 315 which may be used, for example, to provide a convenient interface to permit first user 305 to browse information available over network 360. For example, in one embodiment, browser application 315 may be implemented as a web browser configured to view information available over the Internet. First user device 310 may also include one or more toolbar applications 320 which may be used, for example, to provide client-side processing for performing desired tasks in response to operations selected by first user 305. In one embodiment, toolbar application 320 may display a user interface in connection with browser application 315 as further described herein.

First user device 310 may further include other applications 325 as may be desired in particular embodiments to provide desired features to first user device 310. For example, other applications 325 may include security applications for implementing client-side security features, programmatic client applications for interfacing with appropriate application programming interfaces (APIs) over network 360, or other types of applications. Applications 325 may also include email, texting, voice and IM applications that allow first user 305 to send and receive emails, calls, and texts through network 360, as well as applications that enable the user to make payments through the payment provider as discussed above. First user device 310 includes one or more user identifiers 330 which may be implemented, for example, as operating system registry entries, cookies associated with browser application 315, identifiers associated with hardware of first user device 310, or other appropriate identifiers, such as used for payment/user/device authentication. In one embodiment, user identifier 330 may be used by a payment service provider to associate first user 305 with a particular account maintained by the payment provider as further described herein. A communications application 322, with associated interfaces, enables first user device 310 to communicate within system 300.

Second user device 362 may have similar applications and modules as first user device 310, but is used, in this example, for designating one or more users and allowing the one or more users, such as first user 305, to select an account associated with second user 306 for funding a purchase by the one or more users. Restrictions, limitations, and conditions may be placed for each designated user. Second user device 362 may also include one or more browser applications 315 and one or more toolbar applications 320 which may be used, for example, to provide a convenient interface to permit second user 306 to browse information and perform tasks over network 360. For example, in one embodiment, browser application 315 may be implemented as a web browser configured to view information available over the Internet and communicate with payment provider server 370 to receive and send information about adding a friendly funding source for another user to use.

Second user device 362 may further include other applications 325 such as security applications for implementing client-side security features, programmatic client applications for interfacing with appropriate application programming interfaces (APIs) over network 360, or other types of applications. Applications 325 may also include email, text, IM, and voice applications that allow second user 306 to communicate through network 360, designate users, and create and manage friendly funding sources. Second user device 362 includes one or more user identifiers 330 which may be implemented, for example, as operating system registry entries, cookies associated with browser application 315, identifiers associated with hardware of second user device 362, or other appropriate identifiers, such as used for payment/user/device authentication, e.g., the phone number associated with second user device 362. Identifiers may be used by a payment service provider to associate second user 306 with a particular account maintained by the payment service provider.

Merchant server 340 may be maintained, for example, by an on-line merchant or seller offering various products and/or services in exchange for payment to be received over network 360. Generally, merchant server 340 may be maintained by anyone or any entity that receives money, which includes charities as well as retailers. Merchant server 340 includes a database 345 identifying available products and/or services (e.g., collectively referred to as items) which may be made available for viewing and purchase by first user 305. Accordingly, merchant server 340 also includes a marketplace application 350 which may be configured to serve information over network 360 to browser 315 of first user device 310 and second user device 362. In one embodiment, first user 305 may interact with marketplace application 350 through browser applications over network 360 in order to view various products or services identified in database 345.

Merchant server 340 also includes a checkout application 355 which may be configured to facilitate the purchase by first user 305 of goods or services identified by marketplace application 350. Checkout application 355 may be configured to accept payment information from first user 305 through payment service provider server 370 over network 360. For example, checkout application 355 may receive and process a payment confirmation from payment service provider server 370, as well as transmit transaction information to the payment provider and receive information from the payment provider (e.g., a transaction ID). Checkout application 355 may also be configured to accept one or more different funding sources, including friendly funding sources, for payment.

Payment provider server 370 may be maintained, for example, by an online payment service provider which may provide payment between first user 305 and the operator of merchant server 340, as well as provide payment services for second user 306. In this regard, payment provider server 370 includes one or more payment applications 375 which may be configured to interact with first user device 310, second user device 362, and/or merchant server 340 over network 360 to facilitate the purchase of goods or services by first user 305 of first user device 310 using an account of second user 304.

Payment provider server 370 also maintains a plurality of user accounts 380, each of which may include account information 385 associated with individual users. For example, account information 385 may include private financial information of users of devices such as account numbers, passwords, device identifiers, user names, phone numbers, credit card information, bank information, or other financial information which may be used to facilitate online transactions by first user 305 and second user 306. Advantageously, payment application 375 may be configured to interact with merchant server 340 on behalf of first user 305 during a transaction with checkout application 355 to track and manage purchases made by users and which funding sources are used.

A transaction processing application 390, which may be part of payment application 375 or separate, may be configured to receive information from a user device and/or merchant server 340 for processing and storage in a payment database 395. Transaction processing application 390 may include one or more applications to process information from first user 305 and/or second user 306 for processing a payment using a friendly funding source as described herein. Other funding sources may also be processed through this application. Payment application 375 may be further configured to determine the existence of and to manage accounts for first user 305 and/or second user 306, as well as create new accounts if necessary, such as the set up, management, and use of friendly funding sources.

Figure 4:
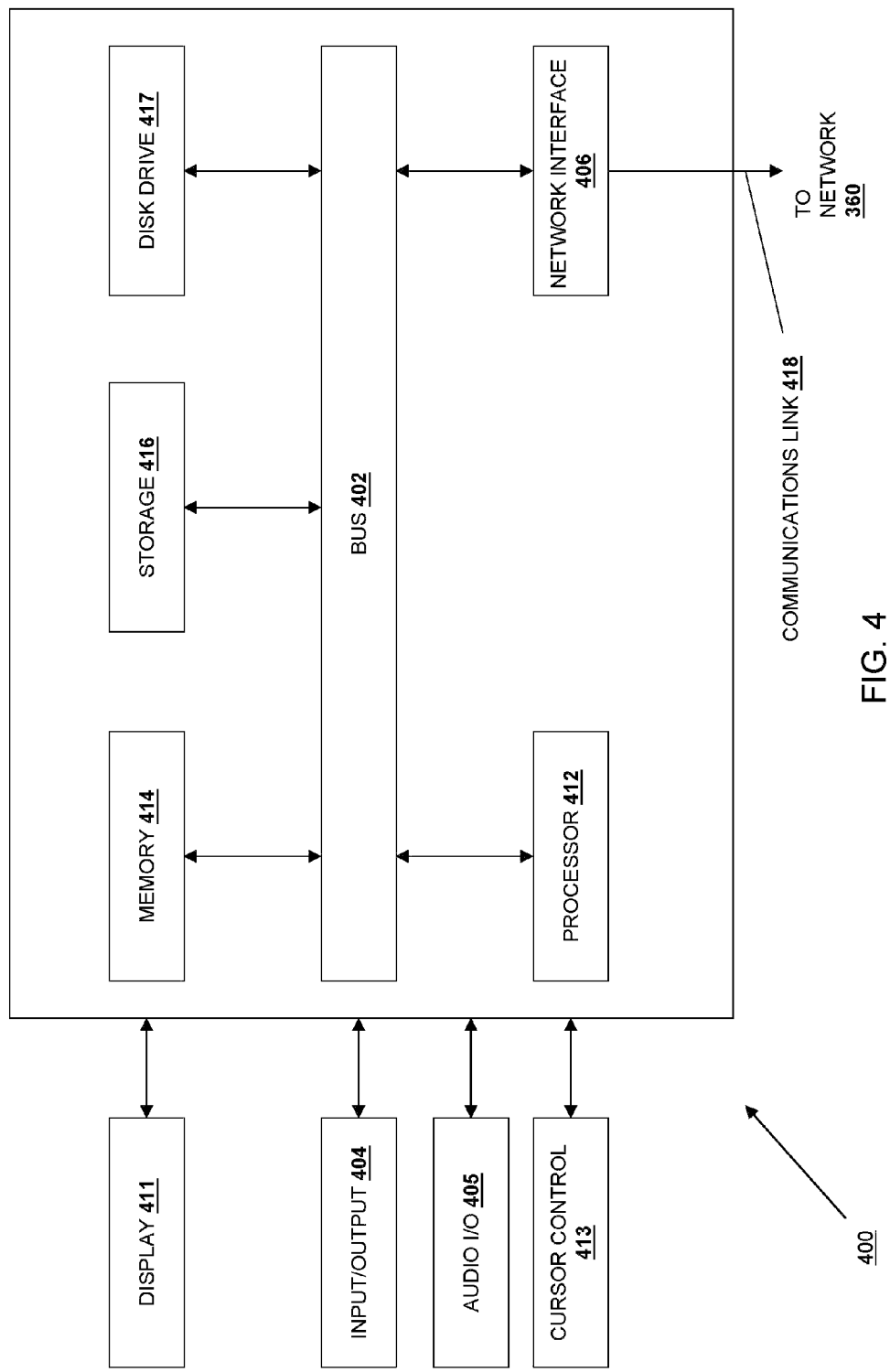
FIG. 4 is a block diagram of a computer system suitable for implementing one or more components in FIG. 3 according to one embodiment of the present disclosure.

FIG. 4 is a block diagram of a computer system 400 suitable for implementing one or more embodiments of the present disclosure. In various implementations, the user device may comprise a personal computing device (e.g., a personal computer, laptop, smart phone, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method of performing financial transactions, comprising:
   receiving, by a processor of a payment provider, a request for a payment to a recipient for a transaction from a first user device associated with a first user having an account with the payment provider;
   determining, by the processor, available funding sources for the first user, including a friendly funding source from a second user device associated with a second user, wherein the second user has an account with the payment provider, and a payment card funding source, the payment card being registered to the first user;
   causing, by the processor, the presentation of the friendly funding source to the first user and an indication of at least one limit associated with the friendly funding source on an electronic display, wherein the at least one limit is set by the second user;
   receiving, by the processor, selected funding sources from the first user, wherein the selected funding sources include the friendly funding source and the payment card funding source;
   determining, by the processor, whether the friendly funding source has reached a spending limit and whether the selected friendly funding source has a restriction imposed by the second user for the transaction; and configuring the processor to perform operations comprising:

presenting, on the electronic display, an option to resubmit the request for payment with a different funding source to the first user in addition to the friendly funding source in response to determining that the friendly funding source has reached the spending limit and is available for use with the transaction based at least in part on the restriction;

terminating the transaction without the presentation of the option to resubmit the request for payment in response to determining that the friendly funding source is not available for use with the transaction based at least in part on the restriction; and processing the request for the payment based on the selected funding sources without requesting approval from the second user in response to determining that the friendly funding source has not reached the spending limit and is available for use with the transaction based at least in part on the restriction, wherein the processing includes:

transmitting a notification alert over a wireless communication channel to the second user device associated with the second user based upon a transmission destination address of the second user device;

wherein the notification alert activates a payment information viewer application to cause the notification alert to display on the second user device and to enable a wireless connection via the notification alert to a remote data server of the payment service provider over a computer network when the second user device is wirelessly connected to the remote data server and when the remote data server is online.

2. The method of claim 1, wherein the selected funding sources comprise a third funding source.

3. The method of claim 1, wherein the second user is known by the first user.

4. The method of claim 1, wherein the restrictions comprise a limit on the amount available for funding a specific transaction of the first user.

5. The method of claim 1, further comprising:

receiving, by the processor, an identifier of the first user from the second user;

receiving, by the processor, any restrictions for the use of the friendly funding source by the first user, set by the second user; and creating the friendly funding source as an available funding source for the first user.

6. The method of claim 1, further comprising notifying the second user when the first user uses the friendly funding source.

7. The method of claim 1, further receiving a modification to the friendly funding source from the second user.

8. The method of claim 1, further comprising presenting on the electronic display a list of available friendly funding sources.

9. The method of claim 8, wherein the list of available friendly funding sources is specific to a transaction associated with the request for the payment.

10. A non-transitory machine-readable medium having stored thereon machine-readable instructions executable to cause a machine to perform operations comprising:

receiving a request for a payment to a recipient for a transaction from a first user device associated with a first user having an account with a payment provider;

determining available funding sources for the first user, including a friendly funding source from a second user device associated with a second user, wherein the second user has an account with the payment provider, and a payment card funding source, the payment card being registered to the first user;

presenting, on an electronic display, the friendly funding source to the first user and an indication of at least one limit associated with the friendly funding source, wherein the at least one limit is set by the second user;

receiving selected funding sources from the first user, wherein the selected funding sources include the friendly funding source and the payment card funding source;

determining whether the friendly funding source has reached a spending limit;

determining whether the selected friendly funding source has a restriction imposed by the second user for the transaction;

presenting, on the electronic display, an option to resubmit the request for payment with a different funding source to the first user in addition to the friendly funding source in response to determining that the selected friendly funding source has reached the spending limit and is available for use with the transaction based at least in part on the restriction;

terminating the transaction with the friendly funding source without presenting an option to resubmit in response to determining that the friendly funding source is not available based at least in part on the restriction; and processing the request for the payment based on the selected funding sources without requesting approval from the second user in response to determining that the selected friendly funding source has not reached the spending limit and is available for use with the transaction based at least in part on the restriction, wherein the processing includes:

transmitting a notification alert over a wireless communication channel to the second user device associated with the second user based upon a transmission destination address of the second user device;

wherein the notification alert activates a payment information viewer application to cause the notification alert to display on the second user device and to enable a wireless connection via the notification alert to a remote data server of the payment service provider over a computer network when the second user device is wirelessly connected to the remote data server and when the remote data server is online.

11. The non-transitory machine-readable medium of claim 10, wherein the selected funding sources comprise a third funding source.

12. The non-transitory machine-readable medium of claim 10, wherein the second user is known by the first user.

13. The non-transitory machine-readable medium of claim 10, wherein the restrictions comprise a limit on the amount available for funding a specific transaction of the first user.

14. The non-transitory machine-readable medium of claim 10, wherein the operations further comprise:

receiving an identifier of the first user from the second user;

receiving any restrictions for the use of the friendly funding source by the first user, set by the second user; and creating the friendly funding source as an available funding source for the first user.

15. The non-transitory machine-readable medium of claim 10, wherein the operations further comprise notifying the second user when the first user uses the friendly funding source.

16. The non-transitory machine-readable medium of claim 10, wherein the operations further comprise receiving a modification to the friendly funding source from the second user.

17. The non-transitory machine-readable medium of claim 10, wherein the operations further comprise presenting on the electronic display a list of available friendly funding sources.

18. The non-transitory machine-readable medium of claim 17, wherein the list of available friendly funding sources is specific to a transaction associated with the request for the payment.

19. An electronic payment processing system comprising:
one or more hardware processors coupled to a non-transitory memory and configured to read instructions from the non-transitory memory to cause the system to perform operations comprising:
receiving a request for a payment to a recipient for a transaction from a first user device associated with a first user having an account with a payment provider;
determining available funding sources for the first user, including a friendly funding source from a second user device associated with a second user, wherein the second user has an account with the payment provider, and a payment card funding source, the payment card being registered to the first user;
presenting, on an electronic display, the friendly funding source to the first user and an indication of at least one limit associated with the friendly funding source, wherein the at least one limit is set by the second user;
receiving selected funding sources from the first user, wherein the selected funding sources include the friendly funding source and the payment card funding source;
determining whether the friendly funding sources has reached a spending limit;
determining whether the selected friendly funding source has a restriction for the transaction imposed by the second user;
presenting an option to resubmit the request for payment with a different funding source to the first user in addition to the friendly funding source in response to the selected friendly funding source having reached the spending limit and is available for use with the transaction based at least in part on the restriction;
terminating the transaction with the friendly funding source without the presentation of the option to resubmit the request for payment in response to determining that the selected friendly funding source is unavailable based at least in part on the restriction; and
processing the request for the payment based on the selected funding sources without requesting approval from the second user in response to determining that the selected friendly funding source has not reached the spending limit and the friendly funding source is available based at least in part on the restriction, wherein the processing includes:
transmitting a notification alert over a wireless communication channel to the second user device associated with the second user based upon a transmission destination address of the second user device;
wherein the notification alert activates a payment information viewer application to cause the notification alert to display on the second user device and to enable a wireless connection via the notification alert to a remote data server of the payment service provider over a computer network when the second user device is wirelessly connected to the remote data server and when the remote data server is online.

20. The system of claim 19, wherein the selected funding sources comprise a third funding source.

21. The system of claim 19, wherein the second user is known by the first user.

* * * * *